a2 United States Patent
Fitzsimmons et al.

(10) Patent No.: US 9,063,935 B2
(45) Date of Patent: Jun. 23, 2015

(54) SYSTEM AND METHOD FOR SYNCHRONOUSLY GENERATING AN INDEX TO A MEDIA STREAM

(75) Inventors: Jeffrey E. Fitzsimmons, Milwaukee, WI (US); Matthew Stockton, Milwaukee, WI (US); Marc Della Torre, San Jose, CA (US)

(73) Assignee: HarQen, LLC, Milwaukee, WI (US)

( * ) Notice: Subject to any disclaimer, the term of this patent is extended or adjusted under 35 U.S.C. 154(b) by 93 days.

(21) Appl. No.: 13/163,314

(22) Filed: Jun. 17, 2011

(65) Prior Publication Data

US 2012/0323925 A1 Dec. 20, 2012

(51) Int. Cl.
*G06F 17/30* (2006.01)

(52) U.S. Cl.
CPC .... *G06F 17/30038* (2013.01); *G06F 17/30044* (2013.01); *G06F 17/30064* (2013.01); *G06F 17/30017* (2013.01); *G06F 17/3002* (2013.01)

(58) Field of Classification Search
CPC ............... G06F 17/30017; G06F 17/30038; G06F 17/30044; G06F 17/30064
USPC .................................. 707/741, 758
See application file for complete search history.

(56) References Cited

U.S. PATENT DOCUMENTS

| 6,453,164 B1* | 9/2002 | Fuller et al. ............. 455/445 |
| 7,469,271 B2* | 12/2008 | Shimada et al. ......... 709/206 |
| 8,050,923 B2* | 11/2011 | Blair ....................... 704/251 |
| 2002/0142756 A1* | 10/2002 | Rutledge et al. ........ 455/412 |
| 2008/0228749 A1 | 9/2008 | Brown |
| 2009/0019061 A1* | 1/2009 | Scannell, Jr. ............ 707/10 |
| 2009/0171973 A1* | 7/2009 | Gagne et al. ............ 707/10 |
| 2009/0327895 A1* | 12/2009 | Bailloux et al. ......... 715/730 |
| 2010/0042619 A1* | 2/2010 | Jones et al. .............. 707/5 |
| 2010/0082575 A1 | 4/2010 | Walker et al. |
| 2010/0088583 A1 | 4/2010 | Schachter |
| 2010/0094627 A1 | 4/2010 | Katpelly et al. |
| 2010/0287050 A1* | 11/2010 | Jones et al. ............ 705/14.58 |
| 2011/0276334 A1* | 11/2011 | Wang et al. ............ 704/270 |
| 2012/0030292 A1* | 2/2012 | John et al. .............. 709/206 |
| 2012/0072845 A1* | 3/2012 | John et al. .............. 715/738 |

* cited by examiner

*Primary Examiner* — Leslie Wong
(74) *Attorney, Agent, or Firm* — Boyle Fredrickson, S.C.

(57) ABSTRACT

A computer-implemented system and method for generating an index to a captured media stream. The system includes an output device configured to play a media stream. The system further includes an automatic tagging system for generating at least one auto tag based on the content of the received media stream, the auto tag associated with a portion of the received media stream and a user driven tagging system for generating at least one user tag based on a command received from a user, the user tag associated with a portion of the received media stream being provided at the time the command is received. The system yet further includes a non-transitory storage medium for capturing the received media stream in a media data file associated with a media index file, the media index file including the at least one auto tag and the at least one user tag.

21 Claims, 7 Drawing Sheets

FIG. 7

SYSTEM AND METHOD FOR SYNCHRONOUSLY GENERATING AN INDEX TO A MEDIA STREAM

FIELD

The present invention relates to systems and methods for generating index points for a received media stream. Specifically, the present invention relates to a system and method for synchronously generating an index for a captured media stream during the capture of the media content.

BACKGROUND

With the drastic drop in the cost of digital data storage over the last decade, it is now feasible for companies and individuals to store a large amount of data that previously would have been unmanageable. This transition has allowed companies to increase both the type and amount of data they are archiving. The policy of storing text based information, (e.g., text files) has been modified to include increasing the storage of media-rich data (e.g., audio and video files).

Although the amount of media-rich data being stored has increased, the stored information is still not as accessible as the information associated with text documents. The rapid organization and easy navigation of text-based information has become ubiquitous and is essentially expected to be available any time text based information is presented. Accordingly, a typical user almost never utilizes text based information in a linear or complete fashion. Search engine technology and rich contextual searching allows users to navigate to specific points of interest within the text based information.

The rapid organization and navigation of audio and video lags behind similar functionality associated with text-based information. Users are generally forced to utilize media rich data in a linear fashion. Even where the data is not used linearly, navigation is based on jumping to points in the audio or video based on the amount of time elapsed, with no other contextual information.

What is desirable is a system and method for providing data tags for media rich content including both user created tags and automatically created tags. What is further desirable is such a system and method configured to provide a rich media playback interface configured to allow users to navigate rich media data based on the data tags. What is yet further needed is such an interface including a search function.

SUMMARY

The present application describes an embodiment of a computer-implemented system and method for generating an index to a captured media stream. The system includes an input port configured to receive a media stream at a first computer system and an output device configured to play the media stream. The system further includes an automatic tagging system for generating at least one auto tag based on the content of the received media stream, the auto tag associated with a portion of the received media stream and a user driven tagging system for generating at least one user tag based on a command received from a user, the user tag associated with a portion of the received media stream being provided at the time the command is received. The system yet further includes a non-transitory storage medium for capturing the received media stream in a media data file associated with a media index file, the media index file including the at least one auto tag and the at least one user tag.

The system may further be configured for associating a user tag or an auto tag with a portion of the received media stream includes recording an elapsed time for the received media stream or receiving a media stream includes receiving an indication from a telephony session indicating that a communication channel has been established and receiving the media stream from the communication channel. In another embodiment, the system is configured for associating a user tag or an auto tag with a portion of the received media stream includes recording an elapsed time of the telephony session.

Generating a user tag can include receiving a text message and storing the text message as an identification of the user tag and/or receiving a selection from a plurality of predefined user tags, wherein the selected predefined user tags is stored as an identification of the user tag. Generating an auto tag can include generating at least one auto tag includes using a speech to text application to generate text from the media stream and matching the generated text with one or more stored criteria and/or generating at least one auto tag includes using a speech to text application to generate text from the media stream and matching the generated text with one or more stored criteria.

The present application may further be implemented as a method such as a computer-implemented method for generating an index to a captured media stream. The method includes the steps of providing a media stream to an output device, generating at least one auto tag based on the content of the received media stream, the auto tag associated with a portion of the received media stream. The steps also include generating at least one user tag based on a command received from a user, the user tag associated with a portion of the received media stream being provided at the time the command is received. The steps yet further include capturing the received media stream in a media data file associated with a media index file, the media index file including the at least one auto tag and the at least one user tag.

The present may also be implemented in a telephony based system for generating an index to a captured media stream. This system includes a telephony system configured to initiate a telephone call based on instructions received from a computer system, an audio content management system configured to perform a plurality of steps to generate audio content using the telephony system, including receiving a telephone call initiation request through a computer implemented graphical interface, initiating a telephone call to a selected telephone number, utilizing at least a portion of the telephone call to generate a media stream. The system further includes an automatic tagging system for generating at least one auto tag based on the content of the generated media stream, the auto tag associated with a portion of the generated media stream and a user driven tagging system for generating at least one user tag based on a command received from a user, the user tag associated with a portion of the generated media stream being provided at the time the command is received. The system yet further includes a non-transitory storage medium for capturing the generated media stream in a media data file associated with a media index file, the media index file including the at least one auto tag and the at least one user tag.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 7 is an exemplary interface 700 reviewing captured audio and associated user and auto tags, according to an exemplary embodiment.

Figure 1:
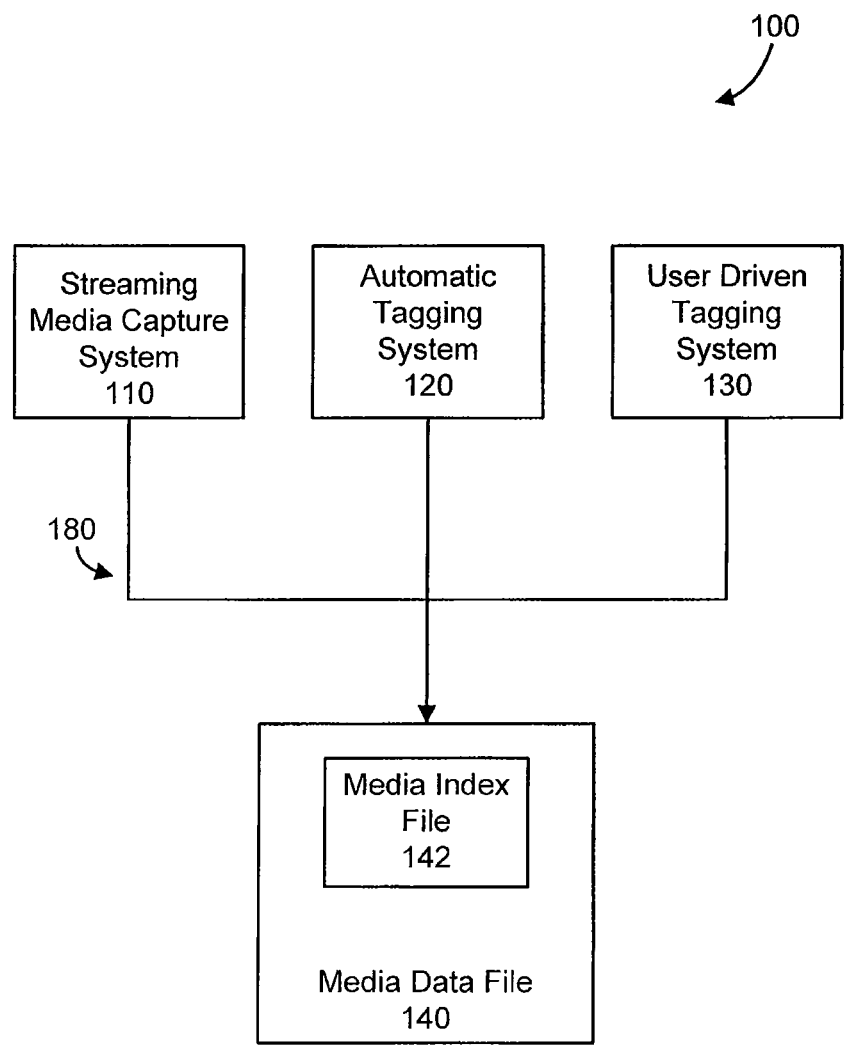
FIG. 1 is a block diagram illustrating a system for synchronously generating an indexed media data file during the capture of a media stream, according to an exemplary embodiment.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Referring now to FIG. 1, a block diagram illustrating a system 100 for synchronously generating an indexed media file during the capture of a media stream including audio and/or visual data input is shown, according to an exemplary embodiment. System 100 is configured to include an streaming media capture system 110, an automatic tagging system 120, and a user driven tagging system 130 that operate cooperatively to generate an indexed media data file 140 having an associated media index file 142. As used herein media is used to refer to any of audio data, video data, graphics data, animation data, computer generated data, signals representing audio and/or video data, etc. and any combination of these types of data. Although system 100 is shown and described as including particular systems and devices in a particular configuration, it should be understood that system 100 may alternatively include more, less, and/or a different configuration of devices and systems configured to implement the functionality described herein.

Systems 110-130 may be implemented by computer systems using any of a wide range of large and small computer systems that are used in computer networks of all types. For example, computer system 110 may be a desktop computing system, a laptop communication system, a handheld computing device, a smart phone, or any other web-enabled computing device configurable to capture and generate a stored media data file in combination with system 120 and 130, as described below in further detail with reference to FIGS. 2-5. Although only a single computing system 110 is shown in FIG. 1, it should be understood that the method and system described herein may be used to connect systems 120 and 130 to a larger number of different systems 110. Further, although system 110-130 are shown and described herein as separate systems, the systems may alternatively be implemented as components in a single computer system.

Streaming media capture system 110 may be any system configured to receive, capture and store streamed audio-visual data. One such system is shown and described hereinbelow with reference to FIG. 2. Receiving stream media data may include receiving media content directly, such as through an input device like a microphone, video camera, etc. and/or receiving media content from a content source, such as an external system that captures the media content and transmits the media content in a signal to capture system 110. Capturing media content can include converting received input into a data format suitable for storage, such as a wave file for audio content, an mpeg file for video content, etc. Storing media content can include creating an media data file 140 and storing the received and captured audio-visual content therein.

Automatic tagging system 120 is a system configured to receive a signal including the streamed media data and to generate one or more information tags associated with specific media data for storage in media index file 142. Information tags may include a description of the specific media data that triggered creation of the information tag. Advantageously, automatic tagging system 120 may be configured to create one set of navigable index points within received audio-visual information to facilitate meaningful organization and navigation of the information.

Automatic tagging system 120 may be configured to monitor the received media data to detect one or more automatic tagging conditions using one or more data monitoring systems based on identified tagging criteria, described in further detail below with reference to FIG. 3. For example, system 120 may include speech recognition software configured to recognize and differentiate between multiple speakers. Accordingly, wherein system 120 includes identifies tagging criteria requiring that the system differentiate between speakers, system 120 may detect an automatic tagging condition whenever a speaker stops and/or starts speaking. Speech recognition may further be used to generate additional data tag data including, but not limited to, speaker identification, word spotting, emotion detection, speech to text conversion, and other voice analytic tools which may be used in generating tags, including both auto tags and user tags.

Upon detecting the existence of an automatic tagging condition, system 120 may be configured to generate an auto-tag associated with the data that created the tagging condition. For example, continuing the example from above, system 120 may generate a plurality of auto-tags for each speaker, each auto-tag being used to indicate data within the media data that is associated with an identified speaker. Accordingly, where received media content is audio content memorializing a conversation between three speakers, system 120 may be configured to generate at least three sets of auto-tags, each set associated with a unique speaker. Other examples may include tagging based on emotion detection, recognition of specific words and/or phrases, etc.

According to another exemplary embodiment, system 120 may be configured to interface with one or more additional software applications and/or systems. For example, system 120 may be configured to recognize a phrase such as "I'll follow up" and generate a calendar item on a specific date or after a defined interval, etc. in response thereto.

System 120 may further be configured to store the auto-tag and the data association in the media index file 142 as is also described below with reference to FIG. 3. According to an exemplary embodiment, the stored data association may include timing information, for example indicating an elapsed time of the audio-visual data at which the data associated with the auto-tag occurs.

In contrast, user driven tagging system 130 is a system configured to receive input from a user directing system 130 generate a specific information tag to be associated with specific media data being streamed at the time the input is received for storage in media index file 142. Accordingly, system 130 is configured to provide the streaming media to the user, for example in a player such as described below with reference to FIG. 4. During the playing of the media stream, system 130 is configured to monitor input devices for commands from the user. Upon receipt of such a command, system 130 generates a tag and notes the media stream data being provided at the time the command is received. System 130 may be configured to operate in conjunction with capture system 110 such that the generated user tag is associated with the capture of the specific media data that triggered creation of the user tag. Advantageously, user driven tagging system 130 may be used to create a second set of navigable index points within received audio-visual information to facilitate meaningful organization and navigation of the information.

Indexed media data file 140 and media index file 142 may be configured to be provided as output from the combination of system 110-130. Data file 140 may be stored in a computer system for later playback using an enhanced media player, such as described below with reference to FIG. 4.

Media index file 142 may be configured to be a structured meta-data format for storing time-synchronized information related to the media stream data stored in data file 140. The data may include, but is not limited to, a start time of the stream, an end time of the stream, a name/description of the stream, names and/or other identifiers for participants that are recorded in the media stream, relevant information about the participants such as speaker identification, word spotting, emotion detection, and any other information about the media stream, such as location recorded, data source, etc. The data may be utilized by one or more additional systems for, for example, speech-to-text conversion, voice analytics, and/or other systems configured for generating auto and/or user tags.

The meta-data may consist of time synchronized information stored as a series of time/value pairs. The time may be an absolute time in milliseconds, a time elapsed since the beginning of the media stream. The value may be any piece of data that could be used to describe the underlying data in the media stream such as tags, notes, words, sentences, numerical values, participant identifiers, links or references to other data, including additional structured meta-data, calendar meta-data, images, videos, additional media streams, etc. Accordingly, system 120 may be configured for associating a time/value pair data to customer relationship management records or relevant systems, associating time/value pair data to chapter headings, etc. Meta-data values may further be associated with a creator of the meta-data, such as a participant or user that may be associated with a time/value pairing.

Figure 2:
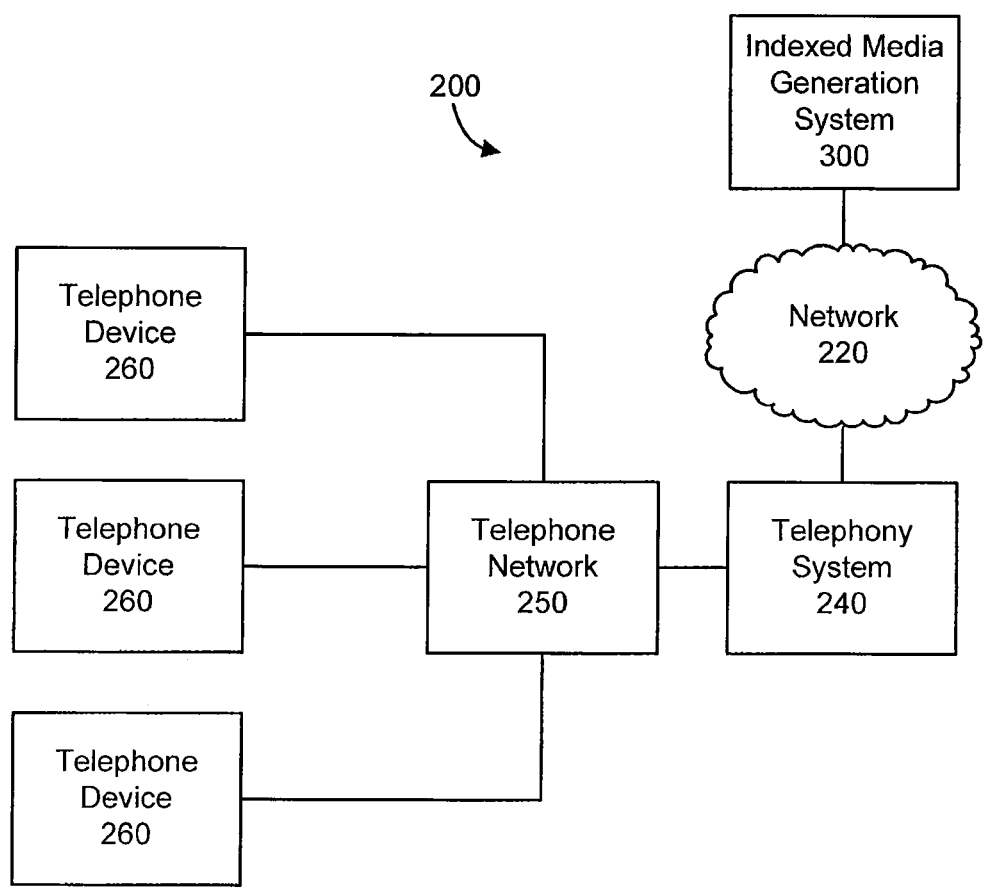
FIG. 2 is a block diagram of one exemplary embodiment of a system for generating indexed media content in conjunction with a telephony system, according to an exemplary embodiment.

Referring now to FIG. 2, a block diagram of one exemplary embodiment of a system 200 for generating indexed media content in conjunction with a telephony system is shown, according to an exemplary embodiment. System 200 shows one example of a system 240 for generating streaming media configured to utilize the functions of an indexed media generation system 300 in generating an indexed media file 140 containing audio data and tags generated during a telephone conference using a telephony calling system. One of ordinary skill in the art would understand that the system and method described herein could alternatively be used in any number of different types of systems for capturing audio-visual content.

Communication network 220 is intended to be representative of the complete spectrum of computer network types including Internet and internet-like networks. Communication network 220 may be utilized to allow communication between system 300 and any number of media generation systems, of which telephony system 240 is representative.

System 300 may be a system for generating automatic and user tags associated with specific data in an indexed media data file contemporaneously with the capture of the media data being stored in the media data file, described in further detail below with reference to FIG. 3. According to an exemplary embodiment, associating a tag with specific data can include associating an elapsed recording time with the tag based on the time that has elapsed since beginning the capture of the media data.

Telephony system 240 is a system configured to allow system 300 to capture a media stream that represents a telephone conversation with one or more users through a device 260 to obtain the media data content provided as an input to system 300 using computer telephone integration CTI software and telephony hardware. According to an exemplary embodiment, CTI software implemented by system 240 communicates with computer system 300 to allow system 300 to control phone functions such as making and receiving voice, fax, and data calls with telephone directory services and caller identification for initiating and timing the media content to be captured. According to one alternative embodiment, telephony system 240 and media indexing system 300 may be implemented using a single computing system.

The CTI software may be configured as an interface between system 300 and the telephone network 250. The software translates commands entered by a user into a website hosted by system 300 into commands that trigger telephony hardware. This functionality allows system 300 to call users (or allows the users to call system 300), and initiate system 300 to record the audio being provided through a device 260.

Telephony hardware may include any type of hardware configured to allow system 240 to connect to a plurality of devices 260 over a telephone network 250. The hardware may consist on Session Border Controller (SBC) clusters, routing clusters and media gateways, as are generally known in the art.

Telephone network 250 may be any telephone network such as the Public Switched Telephone Network (PSTN), the network of the world's public circuit-switched telephone networks. Telephone network 250 is configured to allow audio and data to be transmitted and received between system 300 and devices 260.

User telephone device 260 may include any type of device configured to allow a user to receive a telephone call from system 300. Exemplary devices may include, but are not limited to telephones, mobile phones, VOIP (or similar) devices, etc. Although a single connection and two devices 260 are shown, it should be understood that system 300 may be configured to allow connections to a large number of devices 260 through a large number of telephone connections.

In other exemplary embodiment illustrating one potential use for system 200, system 200 may utilize an interface, such as described below with reference to FIG. 3, to initiate a multi-party recorded conversation or otherwise instruct system 300 that recording of media stream data has begun. For example, a user may utilize system 300 to enter their phone number and a conference call number. System 300 may use system 240 to initiate a phone call to their phone call and bridge the phone call to the conference call number and begin capturing a media stream generated during the ensuing conversation. Alternatively, media stream capture may be initiated by an API, uploading a recorded media stream. During the capture of the media stream, system 300 is further configured to monitor timing information and to accept or generate metadata to be associated with the timing.

Additional data may also be captured for association captured rich media content as shown in TABLE 1 below, although a variety of additional and/or alternative types of data are contemplated. This data may be associated with the captured media stream data, used in the creation of one or more user and/or auto tags, etc.

TABLE 1

| Creation Metadata |
| --- |
| Time of Recording |
| Time of Import into the system |
| Method of Import (e.g. upload from cell phone, database, online service, etc.) |
| Person(s) being recorded |
| Geography/country (may be derived from IP or phone number) |
| Default language of recording |
| Links to invitation, account, or originating request facilitating record |
| Presentations |
| Page number associated with specific time |
| Page number associated with specific range of time |
| Reference to Presentation archived in online repository |
| Text extracted from presentation for markup |
| Agenda extract from presentation for markup |
| Images |
| Tied to a specific time |
| Tied to a specific range of time |
| Images captured using the device generating the media content (such as a cell phone camera) |
| Images uploaded from stock photography index |
| Reference to an online image service |

Figure 3:
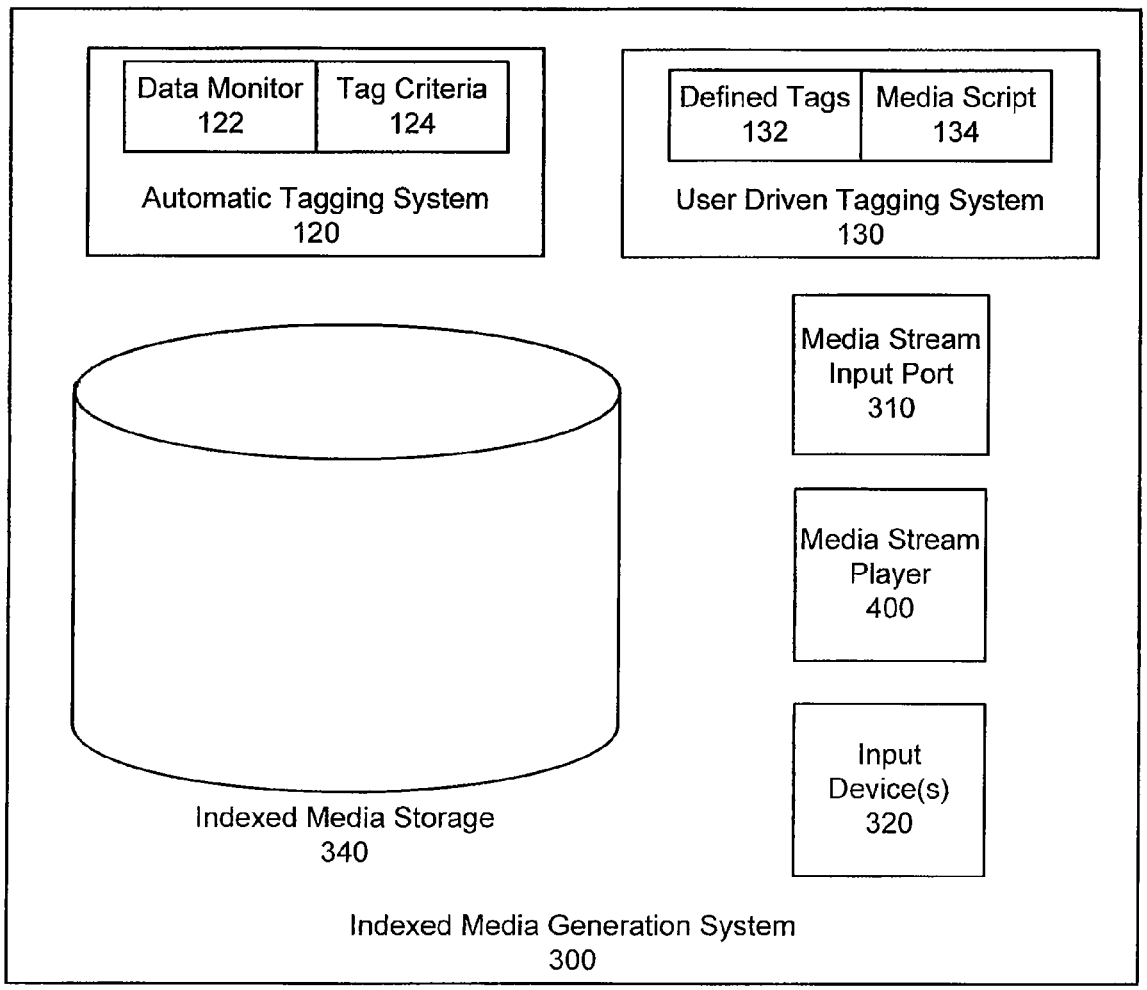
FIG. 3 is the indexed media generation system of FIG. 2 for generating indexed media data files including an auto tagging system and a user tagging system in further detail, according to an exemplary embodiment.

Referring now to FIG. 3, an indexed media generation system 300 for generating indexed media data files including the auto tagging system 120 and the user tagging system 130 of FIG. 1, a media stream input port 310, an indexed media stream player 400, one or more input devices 320, and indexed media storage 340 is shown in further detail, according to an exemplary embodiment. System 300 may be implemented using a standard computer system configured to perform the functions and generate the output described herein.

Media stream input port 310 may be an input port configured to receive streaming data and relay the received streaming data to one or more destinations. The streaming media content may be recorded directly by an input device attached to system 300, such as a microphone or camera, and/or may be received as a data stream from an external system, such as telephony system 240 described above with reference to FIG. 2. According to an exemplary embodiment, the received streaming media content may be stored directly to indexed media storage 340, may be provided as an input to systems 120 and 130, may be displayed to a user of system 300 using player 400, and/or any combination thereof dependent on the functions implemented within system 300 as described herein.

As stated above with reference to FIG. 1, automatic tagging system 120 is configured to receive a signal from input port 310 including the streamed media data and to automatically generate one or more auto tags associated with specific media data based on the data contained within the streamed media data. System 120 is configured to generate the auto tags based on defined tagging criteria, further described below, which may defined by a user during an initialization phase.

Automatic tagging system 120 includes a data monitor 122 to perform data analysis on the received stream data. According to an exemplary embodiment, data monitor 122 processes the received data in substantially real time such that the data is being continuous generated as the data stream is being received at input port 310. Data monitor 122 may be configured to include one or more input processing systems configured to extract data from the streamed audio-visual content, each input processing systems analyzing the received data in parallel to identify data indicated by a tagging criteria, described below with reference to tagging criteria database 124. For example, wherein the data stream is a composite stream composed of two separate data streams received from different input devices, input manager 310 may be configured to separate the audio-visual content stream into multiple streams, wherein each stream represents a different speaker.

Data monitor 122 may be configured to search for particular words, for a specific set of words and/or phrases, for voice inflections, for emotion, media stream characteristics, to prompt system 120 to generate an auto tag to be associated with the detected data. System 120 may further be configured to reference a table listing detected data with particular auto tags to be associated with the data, such as detecting use of the phrase "I will follow up on that" with a particular location and speaker identifier, detecting the use of the word "meeting," followed shortly thereafter with meeting timing information, etc.

Tagging criteria database 124 may be a repository of criteria according to which, system 120 will generate an auto tag. Each criterion may define a parameter such that, upon detection that specific data in the data stream matches the parameter, an auto tag will be generated specific to that criterion and associated with the specific data. Exemplary criterion is shown in TABLE 2 below, although a variety of additional and/or alternative criteria are contemplated.

TABLE 2

| Strength of Accent | Type of Accent | Base Language |
| --- | --- | --- |
| Emotional Tone | Change in Speaker | Keywords |
| Laughter | Speaker Gender | Date |
| Verb Usage | Timing Information | |

As was also stated above with reference to FIG. 1, user driven tagging system 130 is configured to receive input from a user driven system 130 generate a user tag to be associated with specific media data being streamed at the time the input is received. According to an exemplary embodiment, system 130 may include a defined tags database 132 and a media script database 134. System 130 is configured to allow a user to manually define a user tag to be associated with streaming media data that is being received at the time the user tag is defined.

In order to define tags associated with streaming data that is currently being received, system 130 may be configured to operate in conjunction with input port 310, input device 320, and player 400 such that, as streaming media data is received at port 310, the data is provided to a user using the player 400. While receiving the data stream through player 400, the user can use input devices 320 to designate the current location in the media stream to associate with a user tag. To associate the user tag with the streaming media data, system 300 may be configured to receive input from both devices 320 and input port 310 for storage in media storage 340. Selection of a tag may include associating the user tag with timing information, the timing information indicating an elapsed time during which system 300 has captured streaming media data through input port 310.

Defined tags database 132 may include a listing of user tags that are selectable by the user while the user is receiving media data through player 400. Defined tags may include a textual identifier that will help the user identify a reason for associating the user tag with the media data. Exemplary identifiers are provided below in Table 3.

TABLE 3

| Start of Recording | End of Recording | To Do Item |
|---|---|---|
| Important Information | Question | Follow Up Item |
| Archive Item | Uploaded Item Association | |

Defined tags database may be configured to operate in cooperation with player 400 to a present an interface that allows a user to manually input meta-data that is relevant to the media stream being provided through the player 400. The interface may be a web interface that includes, for example, a text box for free form input used to create a user tag, a listing of selectable tags that may be clicked by the user to create user tag. Upon input, the meta-data is correlated to an absolute time in milliseconds or a range of time since the start of the media stream.

According to an exemplary embodiment, system 300 may be utilized in a computer-implemented method in which the media stream is associated with a media stream script in which at least one user involved in the generation of the media stream is acting in accordance with a media script stored within media script database 134. A media script may be a script to be read by a user in generating the media stream. One example may be a series of questions and/or responses to be read by a sales associate during a sales call that is used to generate the media stream.

In operation, system 300 may be configured to implement a speech to text application to convert an audio portion of the media stream to a text file using data monitor 122. The transcribed text file may be data matched to a media script in database 134 to assist a user in knowing what to say next, to record and tag responses to script lines using automatic tagging system 120, to suggest script lines based on responses to questions, etc.

Figure 4:
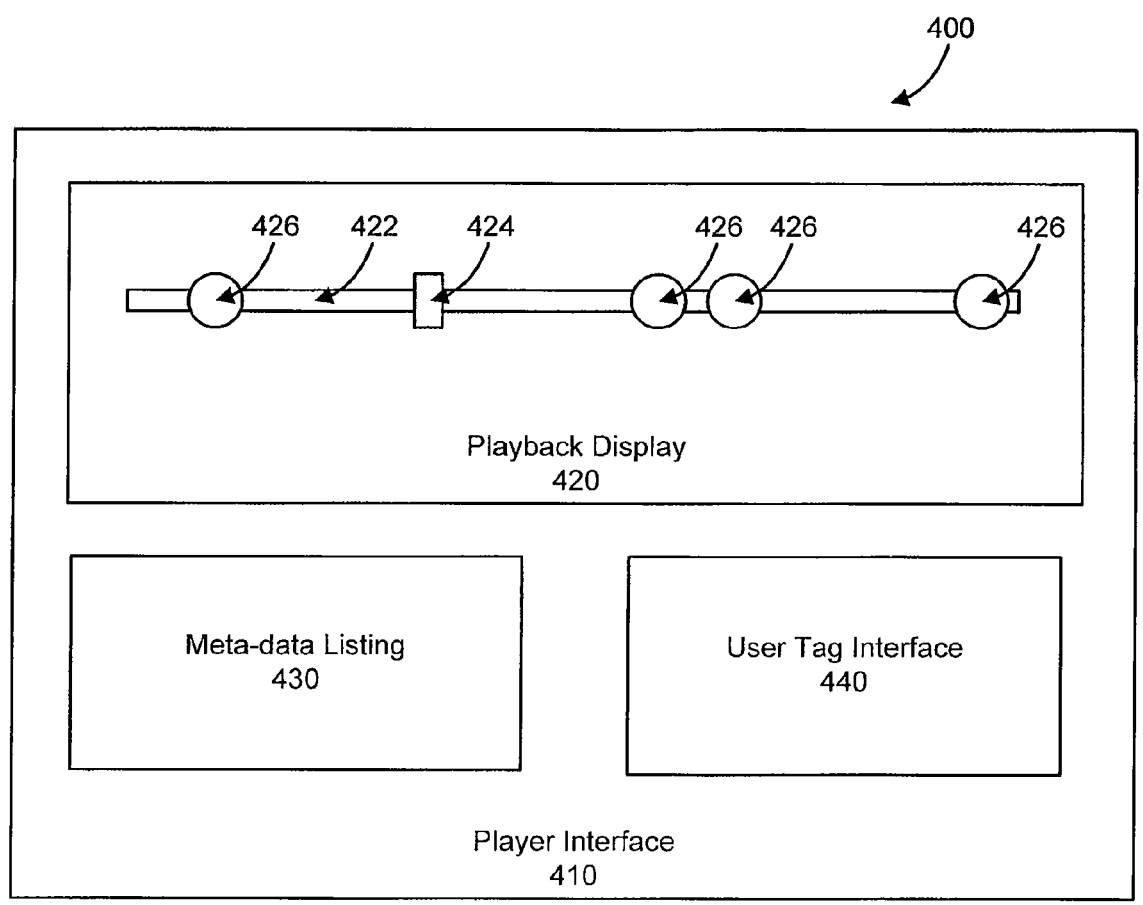
FIG. 4 is a graphical interface for a media stream player configured to play a media stream using one or more output devices of system, according to an exemplary embodiment.

Referring now to FIG. 4, a graphical interface 410 for a media stream player 400 configured to play a media stream using one or more output devices of system 300 is shown, according to an exemplary embodiment. Exemplary output devices can include a display and speakers. Graphical interface 400 may be implemented using a web page created using hypertext markup language (HTML) or other language codes to implement the functions described hereinbelow.

Graphical interface 410 may be configured to display one or more streaming media data files, the display including a link to the audio file that will launch a player 400 and play back the media file. During playback of the streaming media data file, interface 410 is configured to display correlate metadata in a time synchronous manner. For example, a playback display 420 may display a playback bar 422 indicating timing for the media stream, including a current playback indicator 424. Display 420 may further display one or more meta-data indicators 426 indicating the timing of meta-data related to the media stream timing.

Interface 410 may further include a metadata listing 430 including a listing of tags associated with a media stream that is currently being provided through player 400. Listing 430 may including a listing of all tags associated with the media stream, including both user tags and auto tags, for example, sorted by timing information, speaker information, tag type, etc. Interface 410 may be configured such that selection of a tag within listing 430 may direct player 400 to the portion of the media stream whose timing is associated with the selected tag. Listing 430 may further include a search function for larger files allowing a user to search the meta-data based on a defined criteria. Playback based on a selected tag may include a bracketed playback such that a defined amount of the media stream before and/or after the selected tag is played through player 400.

Interface 410 may be configured to display metadata listing 430 in accordance with one or more weighting algorithms. The weighting algorithms may be configurable by a user based on, for example, clustering of auto tags, identification of the speaker, inflection of the speaker, volume of the audio, etc. Advantageously, tag weighting may allow a user to identify and quickly review key parts of a captured media stream.

Interface 410 may further be configured to interface with one or more external system to provide information obtained using system 100 is a non-linear format. For example, system 100 may be configured to monitor sales call as a component in a customer relationship management (CRM) system. Using system 100, the customer relationship management system may receive and archive recorded media that is associated with specific user and/or auto tags. For example, a CRM system may be configured to receive all auto-tags wherein the inflection recorded indicates anger in association with a recorded media stream for a time period preceding the auto-tagged inflection. Other exemplary systems may include, but are not limited to, conferencing systems, networking systems, contact information management systems, social networking environments, etc.

Interface 410 may further be configured to provide a search interface allowing a user to search to a particular tag type in a plurality of captured media streams. For example, interface 410 may be configured to allow a user to retrieve all captured media stream data related to a particular keyword. The captured media stream data may be a subsection of an archived media stream. For example, interface 410 may be used to retrieve all references to a particular product line and media stream data bracketing a time frame such as 30 seconds before and after the reference. The reference may be retrieved from captured media stream data representing, for example, all conference calls within a designated time frame.

Figure 5:
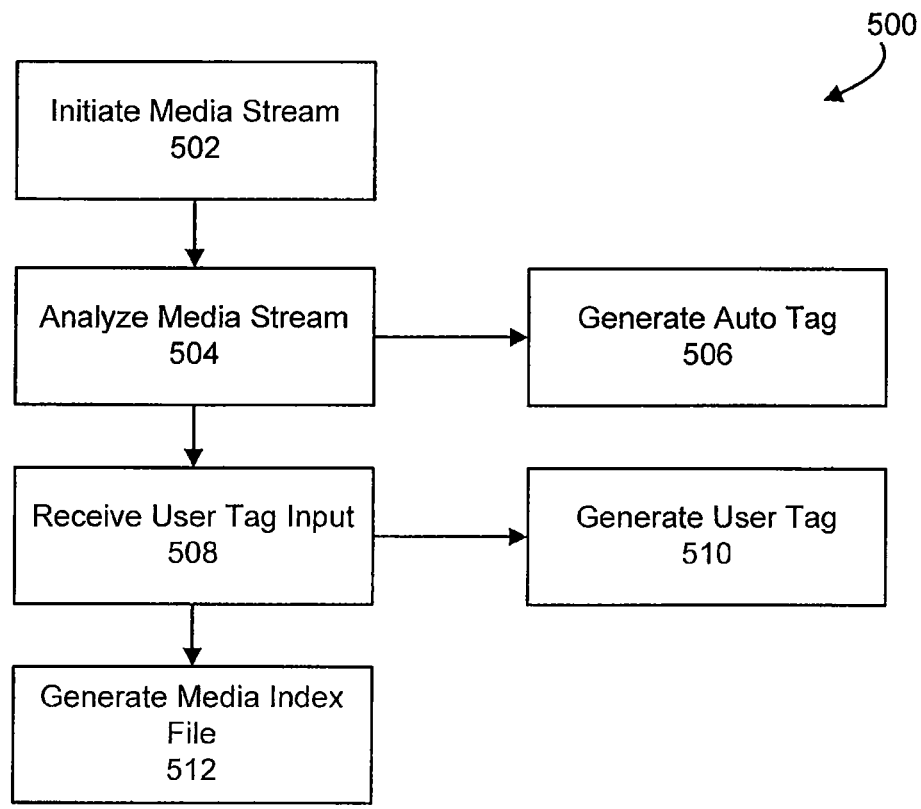
FIG. 5 is a flowchart illustrating a method for associating meta-data with captured media stream data including timing information, according to an exemplary embodiment.

Referring now to FIG. 5, a flowchart 500 illustrating a method for associating meta-data with captured media stream data including timing information is shown, according to an exemplary embodiment. The method of flow chart 500 may be implemented, for example, by system 300 operating in conjunction with telephony system 240.

In a step 502, system 300 may be used to initiate the capture of media stream data. Media stream capture may be initiated based on a user prompt, such as a user initiated phone conference, uploading of a media stream, clicking a button to start recording an existing media stream, etc. Media stream capture may also be initiated automatically by system 300, such as based on detecting an incoming phone call, detecting a characteristic of a received media stream, etc.

In a step 504, system 300 is configured to monitor incoming data to detect satisfaction of one or more criteria configured to prompt creation of an auto tag. Monitoring data may be performed using one or more additional systems and methods such as a speech to text application, an image recognition application, sound analysis applications, etc. Based on detected data that satisfies the criteria, an auto tag may be created in a step 506 and associated with the detected data.

In a step 504, system 300 is configured to monitor one or more user inputs to receive an indication that a user would like to create a user tag to be associated with media stream data currently being provided. The user inputs may be monitored for selection of a pre-defined user tag type, for entry of text information, etc. Based on the received user input, a user tag may be created in a step 510 and associated with the currently provided media stream data.

In a step 512, the auto tag data and user tag data may be used to generate a comprehensive media index file to be associated with a media data file containing the capture media stream data. Advantageously, the index media file may be used to improve navigability and improve ease of utilization of the captured media stream data. Similar to currently available text based document searching and navigation, the method of flowchart 500 may be used to generate a comprehensive and easily navigable index for captured streaming media data.

Although the steps of flowchart 500 are shown and described in a particular order, one should recognize that the steps may be performed in any order and/or concurrently to provide the advantages described herein. Further, flowchart 500 may be implemented using more or fewer steps and may be performed using a variety of types of systems.

Figure 6:
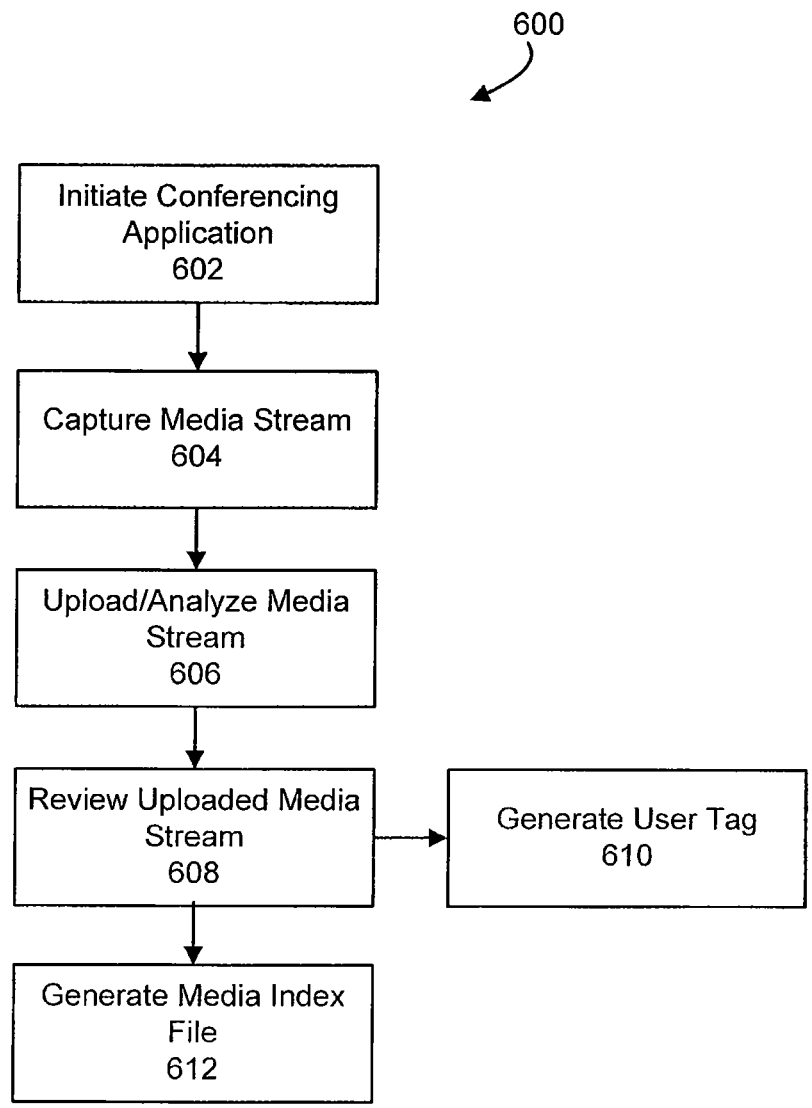
FIG. 6 is a flow chart illustrating a method for generating indexed media content, according to an exemplary embodiment.

Referring now to FIG. 6, a flowchart 600 illustrating a method for generating a captured media stream data associated with auto and/or users tags is shown, according to an exemplary embodiment. In a step 602, a user initiates an application for initiating a conference to be recorded. The application may be configured to be implemented within system 300 and/or include system 300 as a component.

In a step 604, a user selects an option to record a conference causing the creation of a captured media stream. The recording may be initiating using any number of systems such as a smart phone, a digital recorder, a personal computing device, etc. In a step 606, the user uploads the captured media data to system 300. Uploading the capture media data may include analyzing the uploaded media stream to generate one or more auto tags. An exemplary auto tag may be the source of media stream. For example, if the source is an identified person, an auto tag may be generated indicating that the media stream is a recording of a specific person.

Recording a conference may include customizing the operation of system 300. For example, the application may provide drop-down custom flags allowing a user to identify conversation components to be auto tagged such as ToDo items, decision point items, items of concern, scheduling items, etc. These items may further be edited it the step 608 for providing user tags.

In a step 608, the user is provided with an interface for providing user inputs indicating that the user would like to create a user tag to be associated. As stated previously, the user inputs may be monitored for selection of a pre-defined user tag type, for entry of text information, etc. Based on the received user input, a plurality of user tags may be created in a step 610 and associated with the currently provided media stream data. Step 608 may be implemented using a dashboard that is displayed during the capture of the conference to be recorded and/or during playback of captured media data.

Figure 7:
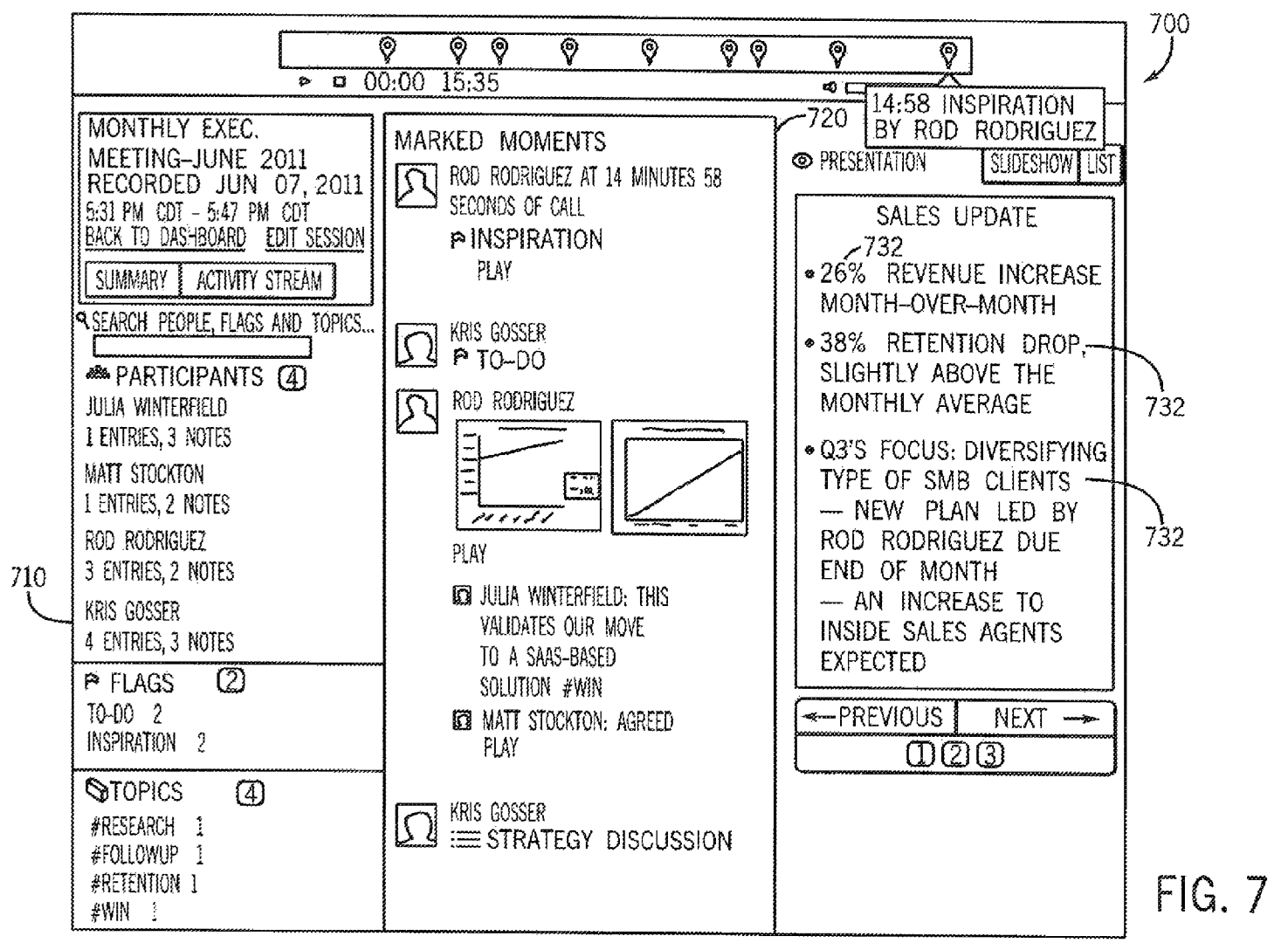

Referring now to FIG. 7, an exemplary interface 700 for reviewing captured audio and associated user and auto tags is shown, according to an exemplary embodiment. Interface 700 includes a tag listing 710 including both auto and user tags. As shown in listing 710, tags may be categorized and/or otherwise sorted. Interface 700 may further display a listing of tags 720 including option to playback associated media stream data.

Interface 700 may further include a presentation interface 730 configured to display, for example, a PowerPoint presentation slide as shown in FIG. 7. The presentation slide may be modified to include one or more slide embedded user or auto tags 732 wherein the embedded user and/or auto tags are associated with media stream data captured during discussion of that particular item in the presentation slide. The item may be identified by autotagging, for example by matching slide text data to speech-to-text data from the media stream, by user tags, for example by the user selecting the slide text and providing an indication that the media data currently being captured or played is relevant.

In a step 612, the auto tag data and user tag data may be used to generate a comprehensive media index file to be associated with a media data file containing the capture media stream data. Advantageously, the index media file may be used to improve navigability and improve ease of utilization of the captured media stream data. Similar to currently available text based document searching and navigation, the method of flowchart 500 may be used to generate a comprehensive and easily navigable index for captured streaming media data.

It is important to recognize that system 300 may be used to create one or more auto tags and/or user tags at any time using archived media stream data. Accordingly, archived media stream data may be analyzed by system 300 based on newly available emotion detection methods, to determine usage of one or more keywords in any archived media stream, etc.

Although the steps of flowchart 600 are shown and described in a particular order, one should recognize that the steps may be performed in any order and/or concurrently to provide the advantages described herein. Further, flowchart 600 may be implemented using more or fewer steps and may be performed using a variety of types of systems.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

The invention claimed is:

1. A computer-implemented method for generating an index to a captured media stream, comprising:
   (a) providing a media stream using an output device to play audio and/or video content in the media stream;
   (b) generating at least one auto tag based on media data in the content of the media stream that triggers the generation of the auto tag by a computer system, the auto tag associated with a portion of the received media stream;

(c) generating at least one user tag based on a command received from a user, the user tag associated with a portion of the media stream being provided at the time the command is received;

(d) storing the media stream in a media data file associated with a media index file, the media index file storing meta data comprising time synchronized information as a series of time/value pairs, the value describing the underlying data, the media index file including the at least one time/value pair including an auto tag and the at least one time/value pair including a user tag;

(e) providing a user interface configured to display a listing of the at least one user tag and the at least one auto tag;

(f) receiving a selection from the listing, the selection including a selection of a user tag or an auto tag;

(g) generating an editable action item based on receipt of the selection of the at least one user tag or auto tag, the editable action item including the portion of the media stream associated with the selection of the user tag or the auto tag; and (h) sharing the editable action item with at least one user other than the user generating the user tag.

2. The method of claim 1, wherein associating a user tag or an auto tag with a portion of the media stream includes recording an elapsed time for the media stream.

3. The method of claim 1, further including receiving the media stream including receiving an indication from a telephony session that a communication channel has been established and receiving the media stream from the communication channel.

4. The method of claim 3, wherein associating a user tag or an auto tag with a portion of the media stream includes recording an elapsed time of the telephony session.

5. The method of claim 1, wherein generating a user tag includes receiving a text message and storing the text message as an identification of the user tag.

6. The method of claim 1, wherein generating a user tag includes receiving a selection from a plurality of predefined user tags, wherein the selected predefined user tags is stored as an identification of the user tag.

7. The method of claim 1, wherein generating at least one auto tag includes using a speech to text application to generate text from the media stream and matching the generated text with one or more stored criteria.

8. The method of claim 7, wherein the one or more stored criteria includes at least one of strength of accent, type of accent, base language, emotional tone, and change in speaker.

9. The method of claim 1, wherein the user interface is configured to allow customization of the selections within, the listing including at least one of adding notes, sharing selection with other users, associating selections with presentation materials, associating selection with a user, and assigning selections to a category.

10. A computer-implemented system for generating an index to a captured media stream, comprising;

(a) an output device configured to play media data including audio and/or video content in a media stream;

(b) an automatic tagging system for generating at least one auto tag based on media data in the content of the media stream that triggers the generation of the auto tag by a computer system, the auto tag associated with a portion of the received media stream;

(c) a user driven tagging system for generating at least one user tag based on a command received from a user, the user tag associated with a portion of the media stream being provided at the time the command is received; and (d) a non-transitory storage medium for capturing the media stream in a media data file associated with a media index file, the media index file storing meta data comprising time synchronized information as a series of time/value pairs, the value describing the underlying data, the media index file including the at least one time/value pair including an auto tag and the at least one time/value pair including a user tag; and (e) a tag listing interface configured to
  (i) display a listing of the at least one user tag and the at least one auto tag,
  (ii) receive a selection from the listing, the selection including a selection of a user tag or an auto tag,
  (iii) generate an editable action item based on receipt of the selection of the at least one user tag or auto tag, the editable action item including the portion of the media stream associated with the selection of the user tag or the auto tag, and
  (iv) share the editable action item with at least one user other than the user generating the user tag.

11. The system of claim 10, further wherein associating a user tag or an auto tag with a portion of the media stream includes recording an elapsed time for the received media stream.

12. The system of claim 10, further including a telephony system configured to create a telephony session including a communication channel and to provide the media stream from the communication channel.

13. The system of claim 12, wherein associating a user tag or an auto tag with a portion of the media stream includes recording an elapsed time of the telephony session.

14. The system of claim 10, wherein generating a user tag includes receiving a text message and storing the text message as an identification of the user tag.

15. The system of claim 10, wherein generating a user tag includes receiving a selection from a plurality of predefined user tags, wherein the selected predefined user tags is stored as a user identification tag.

16. The system of claim 10, wherein generating at least one auto tag includes using a speech to text application to generate text from the media stream and matching the generated text with one or more stored criteria.

17. The system of claim 10, wherein the one or more stored criteria includes at least one of strength of accent, type of accent, base language, emotional tone, and change in speaker.

18. A computer-implemented system for generating an index to a captured media stream, comprising:

a telephony system configured to initiate a telephone call based on instructions received from a computer system;

an audio content management system configured to perform a plurality of steps to generate audio content using the telephony system, including
  (a) receiving a telephone call initiation request through a computer implemented graphical interface,
  (b) initiating a telephone call to a selected telephone number,
  (c) utilizing at least a portion of the telephone call to generate a media stream including media data having audio and/or video content in the media stream;

an automatic tagging system for generating at least one auto tag based on media data in the content of the generated media stream that triggers the generation of the auto tag by a computer system, the auto tag associated with a portion of the generated media stream;

a user driven tagging system for generating at least one user tag based on a command received from a user, the user tag associated with a portion of the generated media stream being provided at the time the command is received;

a non-transitory storage medium for capturing the generated media stream in a media data file associated with a media index file, the media index file storing meta data comprising time synchronized information as a series of time/value pairs, the value describing the underlying data, the media index file including the at least one time/value pair including an auto tag and the at least one time/value pair including a user tag; and a tag listing interface configured to
- (i) display a listing of the at least one user tag and the at least one auto tag,
- (ii) receive a selection from the listing, the selection including a selection of a user tag or an auto tag,
- (iii) generate an editable action item based on receipt of the selection of the at least one user tag or auto tag, the editable action item including the portion of the media stream associated with the selection of the user tag or the auto tag; and
- (iv) share the editable action item with at least one user other than the user generating the user tag.

19. The system of claim 18, wherein generating a user tag includes receiving a selection from a plurality of predefined user tags, wherein the selected predefined user tags is stored as an identification of the user tag.

20. The system of claim 18, wherein generating at least one auto tag includes using a speech to text application to generate text from the media stream and matching the generated text with one or more stored criteria.

21. The system of claim 18, wherein the one or more stored criteria includes at least one of strength of accent, type of accent, base language, emotional tone, and change in speaker.

* * * * *